UNITED STATES PATENT OFFICE.

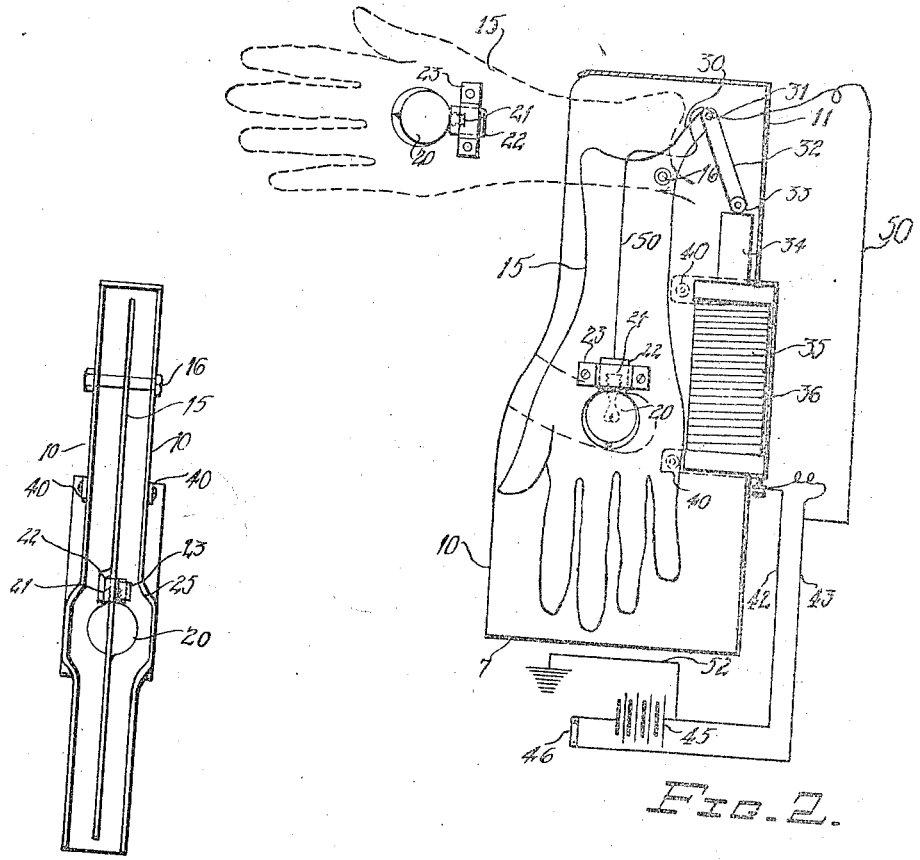

GERHARDT H. NIERMAN, OF CLEVELAND, OHIO.

AUTOMOBILE-SIGNAL.

1,238,430.　　　Specification of Letters Patent.　　Patented Aug. 28, 1917.

Application filed December 14, 1916. Serial No. 136,903.

*To all whom it may concern:*

Be it known that I, GERHARDT H. NIERMAN, a citizen of the United States, residing at Cleveland, in the county of Cuyahoga and State of Ohio, have invented a certain new and useful Improvement in Automobile-Signals, of which the following is a full, clear, and exact description, reference being had to the accompanying drawings.

This invention relates to automobile signals. Its objects are to provide such a signal which may be effective in operation and cheap to manufacture. In carrying out my invention I prefer to use an automobile signal comprising a casing, a pivoted signal arm, which may be of any desired shape, with means for projecting the arm outwardly from the casing to give a signal and allow the same to return within the casing as desired, and an essential object of this invention is to provide a simple effective readily controlled means for projecting the arm from its casing.

The above and other objects will become apparent in the following description, which refers to the drawings, and the essential characteristics are summarized in the claims.

Referring to the drawings, Figure 1 is a partial rear elevation of an automobile indicated in broken lines and showing my signal device in position; Fig. 2 is a vertical section through the signal device, showing its operating means and indicating both positions of the signal arm; Fig. 3 is an edge or side elevation of the device, showing the arm in position; Fig. 4 is a sectional plan of the same.

Designating the parts by reference characters, 5 indicates an automobile having a steering wheel, indicated at 6, and a mud guard 7, on which my signal is mounted. The signal shown comprises an upright casing having side walls 10 and an edge wall 11, the edge opposite the wall 11 being open to permit a signal arm or a semaphore 15 to swing freely into and out of the housing. This arm is shown as pivoted on a transverse bolt 16 extending between the walls 10. The signal member is illustrated as being shaped like a human hand, although it is to be understood that it may be of the form of a semaphore or an arrow, or have any other outline desired.

I prefer to make the signal arm of flat sheet metal and provide the same with a lamp, preferably positioned approximately at the palm of the hand. This light bulb 20 is shown as having its threaded portion 21 fitting a standard socket 22 clamped under a strap 23, shown as removably secured to the metal of the hand, which is recessed opposite the clamp to centrally position the socket and light bulb. The walls 10 are shown as being bowed outwardly slightly in the path of the light, to provide clearance space, as indicated at 25. Extending upwardly and rearwardly from the signal arm adjacent the pivot 16, is an arm 30 shown as pivoted at 31 to a depending link 32, which in turn is pivoted at 33 to an armature 34 and a solenoid 35. The solenoid is mounted in a casing and secured to the side walls 10 of the housing by ears, indicated at 40.

At 42 and 43 are shown wires leading to and from a battery 45. A switch 46 may close the circuit through these wires and battery and solenoid, causing the armature 34 to be drawn downwardly, swinging the signal from the position shown in solid lines, to that shown in broken lines, in Fig. 2. The switch 46 is preferably mounted on the steering column, as indicated at 46ª in Fig. 1, whereby the driver may close the circuit through the battery by merely depressing a switch button, the arm being held in its active signaling position as long as the circuit remains closed. The light of the signal arm is provided to make an effective signal at night, and this light is shown as lighted by current led through a wire 50 extending along the arm 30 and downwardly to the light, while the return current from the lamp is grounded and returns through a ground wire 52 to the other side of the battery.

The light may be disconnected, during the day, by unscrewing it slightly, breaking one of its connections in the socket. The metal of the hand around the lamp limits its outward movement and prevents the bulb becoming disengaged from its socket and thereby being lost.

The battery is preferably the usual electric battery of the automobile, and by the arrangement shown, a minimum number of wires is used for operating the solenoid and lighting the lamp 20. The device is simple to construct and easily mounted in any desired position on the automobile. Its parts

Having thus described my invention, what I claim is:—

1. In a device of the character described, the combination of a housing, a flat signal arm pivoted in the housing and adapted to be projected therefrom, an opening in said signal arm, a lateral depression in the metal thereof adjacent the opening, a light socket seated in said depression, a clamp extending across the socket and secured to the metal of the arm for holding the socket in position, whereby the light socket may be removed by removing the clamp, a light bulb fitting said socket and adapted to be unscrewed to break its connection, the opening into which said socket extends being of such a size as to limit the unscrewing movement, and means for conducting current to said light bulb.

2. In a device of the character described, the combination of a narrow upright housing having an edge wall and two side walls and leaving an open side, a signal arm pivoted in the upper portion of said casing and adapted to stand normally within the casing and having an extension at the side of the pivot opposite the arm, a link depending therefrom, an armature connected with the link, and a solenoid adjacent the arm and parallel therewith, the casing being cut away to admit the solenoid, and a separate container member surrounding the solenoid and secured to the casing.

In testimony whereof, I hereunto affix my signature.

GERHARDT H. NIERMAN.